US012225016B2

(12) United States Patent
Amano

(10) Patent No.: US 12,225,016 B2
(45) Date of Patent: Feb. 11, 2025

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Yasushi Amano, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 402 days.

(21) Appl. No.: 17/334,824

(22) Filed: May 31, 2021

(65) Prior Publication Data
US 2022/0103567 A1  Mar. 31, 2022

(30) Foreign Application Priority Data
Sep. 30, 2020 (JP) .................. 2020-166249

(51) Int. Cl.
*H04L 29/06* (2006.01)
*H04L 9/40* (2022.01)

(52) U.S. Cl.
CPC ........ *H04L 63/105* (2013.01); *H04L 63/0861* (2013.01)

(58) Field of Classification Search
None
See application file for complete search history.

(56) References Cited

U.S. PATENT DOCUMENTS

| | | | |
|---|---|---|---|
| 11,514,138 B1* | 11/2022 | Jakobsson | H04L 63/083 |
| 2017/0118223 A1* | 4/2017 | Mathew | G06F 21/31 |

FOREIGN PATENT DOCUMENTS

| | | | |
|---|---|---|---|
| JP | 2008077190 | | 4/2008 |
| JP | 4848907 | | 12/2011 |
| JP | 2014126956 | | 7/2014 |
| JP | 2019155610 | | 9/2019 |
| JP | 2019155610 A * | | 9/2019 |
| JP | 7339116 B2 * | | 9/2023 |
| KR | 1020210149912 A * | | 12/2021 |

OTHER PUBLICATIONS

Office Action of Japan Counterpart Application, with English translation thereof, issued on Apr. 23, 2024, pp. 1-4.

* cited by examiner

*Primary Examiner* — Andrew J Steinle
(74) *Attorney, Agent, or Firm* — JCIPRNET

(57) ABSTRACT

An information processing apparatus includes: a processor configured to: execute an authentication process of authenticating a user by a first authentication process, which is any one of plural authentication processes having different security levels; and execute, in a case where execution of a job is instructed by the authenticated user authenticated by the first authentication process, and a security level of the first authentication process is lower than a security level of the job, another authentication process of authenticating the authenticated user by a second authentication process having a security level higher than the security level of the first authentication process among the plural authentication processes as an additional authentication process.

15 Claims, 10 Drawing Sheets

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-166249 filed Sep. 30, 2020.

BACKGROUND

(i) Technical Field

The present invention relates to an information processing apparatus and a non-transitory computer readable medium storing a program.

(ii) Related Art

Various authentication technologies are known for verifying identification and preventing information leakage in a case of using an electronic device including a computer system and in a case of using data used in the electronic device. For example, JP2008-077190A describes a technology of authenticating a user by using a biometric authentication in a case where a secret document is requested to be printed by a printer at a remote location. In this technology, a creator of a job related to printing generates biometric authentication information of the creator, a user who can execute the job, and an operation authority in association with the job at a time of job creation, so that only a designated user can execute the job.

In addition, a technology is also known that considers that a result of a biometric authentication fluctuates due to a change in a state of a living body. For example, JP2014-126956A describes a technology of lowering an authentication intensity in a case where a condition related to a job corresponds to an authentication relaxation condition. In this technology, the job is saved in an image forming apparatus, and in a case where a time until authentication is within a predetermined time, a distance between an instruction terminal and the image forming apparatus is within a predetermined distance, an attribute of a transmitter of the job is a predetermined attribute, and an attribute of the job is a predetermined attribute, the authentication intensity of a biometric authentication is lowered.

SUMMARY

Meanwhile, in a case where the job is executed, a security level can be guaranteed by executing the authentication, but in a case where only one authentication is executed, the security level depends on the executed authentication, and the guaranteed security level is changed. On the other hand, regarding the job execution, in a case where a plurality of different authentications are executed, the security level can be higher than the security level of executing one authentication, but in a case where the plurality of authentications are always executed, the burden on the user increases.

Aspects of non-limiting embodiments of the present disclosure relate to an information processing apparatus and a non-transitory computer readable medium storing a program that suppress a decrease in security level while reducing a burden on a user as compared with a case where a plurality of authentications are always performed or the case where only one authentication is always performed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a processor configured to: execute an authentication process of authenticating a user by a first authentication process, which is any one of a plurality of authentication processes having different security levels; and execute, in a case where execution of a job is instructed by the authenticated user authenticated by the first authentication process, and a security level of the first authentication process is lower than a security level of the job, another authentication process of authenticating the authenticated user by a second authentication process having a security level higher than the security level of the first authentication process among the plurality of authentication processes as an additional authentication process.

BRIEF DESCRIPTION OF THE DRAWINGS

Exemplary embodiment(s) of the present invention will be described in detail based on the following figures, wherein.

DETAILED DESCRIPTION

Figure 1:
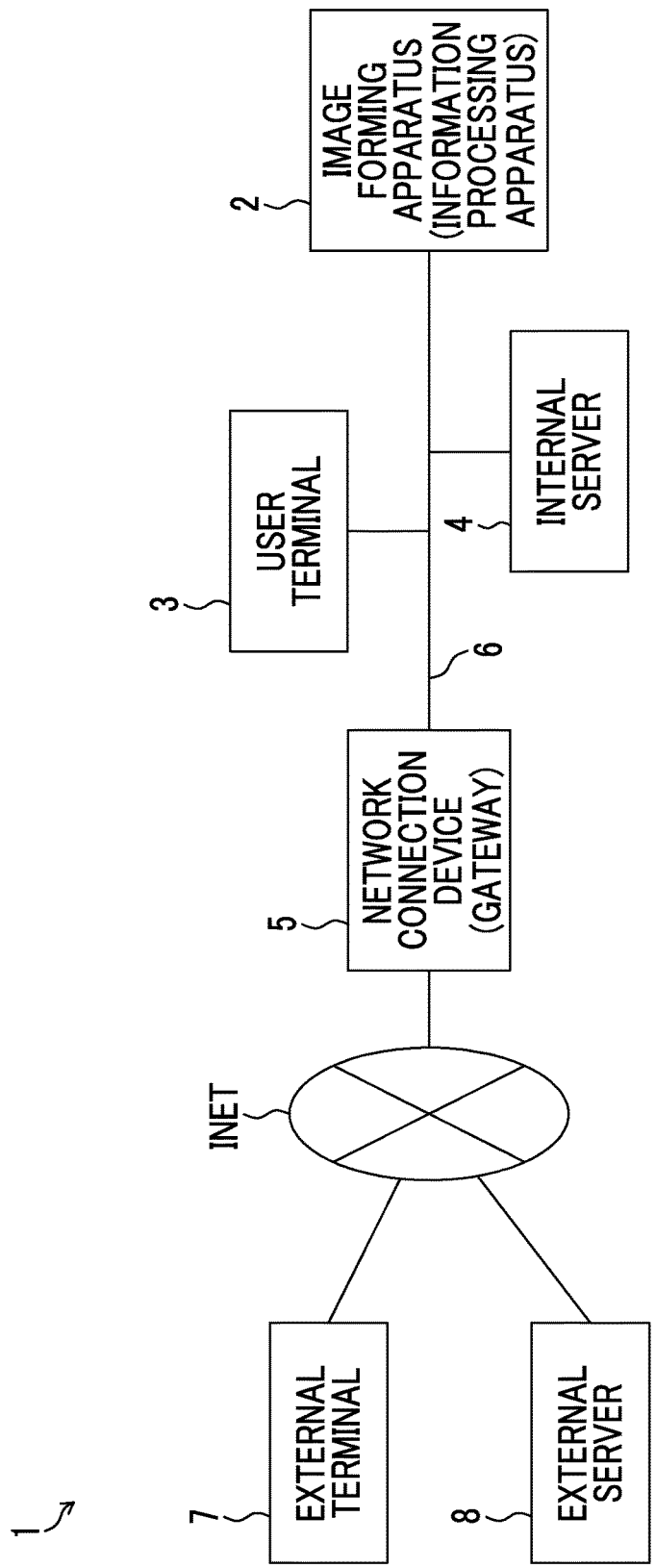
FIG. 1 is a diagram illustrating a schematic configuration of a network system according to an exemplary embodiment.

Hereinafter, an example of exemplary embodiments for implementing a technology according to the present disclosure will be described in detail with reference to the drawings. In the following descriptions, components and processing in which operations, actions, and functions have the same function may be given the same reference numeral with reference to the drawings, and duplicate descriptions may be omitted as appropriate. Each drawing is only schematic enough to fully understand the technologies according to the present disclosure. Therefore, the technology according to the present disclosure is not limited to the illustrated examples. Further, in the present exemplary embodiment, the description may be omitted for configurations which are not directly related to the present disclosure or well-known configurations.

In the present disclosure, "security" is a concept including protection for data, an electronic device that handles data, such as a storage unit that stores the data, and a communication path for communicating the data. The protection here includes preventing the leakage of at least a part of the data to the outside. A "security level" is a concept including information in which the degree of protection against data or the like increases as the security level increases. The security level includes increasing the security level as the number of authentications increases due to at least one of the same authentication method or different authentication methods. In a case where the same authentication method is executed a plurality of times, for example, it is preferable that different conditions are applied. For example, it is desired that different passwords are requested in a case where authentication by password authentication is executed the plurality of times. Further, for biometric authentication such as fingerprint authentication, it is desired that biometric authentications of different fingers are requested, for example.

The security level is information that defines a range of actions permitted to a user by an administrator, such as installation or deletion of application programs, and restrictions or permissions of processing executed by the user, such as changing and saving data and files, for example. The administrator in this case is a specific user who sets a security policy for data, a network, or the like and operates according to the security policy.

In the present disclosure, a "job" is a concept including data itself and a data group including the data and information on the data. An example of the information related to the data includes attribute information related to the data and processing information indicating processing by a processor using the data in response to a user's instruction. An example of the job includes an e-mail transmission job, a facsimile transmission job, a network transmission job, a print job, and a scan job.

The job is a protection target by the included data or information on the data, and the degree of protection for the job may differ depending on contents of the job. Therefore, in the present disclosure, the security level of the job is referred to as a concept in which the degrees of protection for the job are different from each other.

Meanwhile, depending on the degree of protection, the job may be requested to be grasped by the user or the administrator for an operation such as how the job behaves. For example, in order to grasp the operation of the job, information on the operation of the job such as processing by the job and a communication path by the job is saved as a history in time-series, and the information on the operation of the job can be traced. By making it possible to trace the information related to the operation of the job, it becomes possible for the user or the administrator to grasp the operation such as how the job behaves. On the other hand, depending on the contents of the job, saving the history may not be requested. Therefore, by defining the security level of the job to be protected in advance and saving the history for the job having the security level or higher to be protected, the information on the operation of the job to be protected can be traced. Therefore, the job of which history is requested to be saved can be regarded as a job requiring tracking.

In the present disclosure, "biometric authentication" is an example of an authentication method, and is a concept of authentication executed by an individual user by detecting a physical feature with a sensor and using the obtained biometric information. The physical feature is a concept that includes a feature of at least a portion of the body. For example, the physical feature includes a feature of a part of the body such as face, fingerprint, iris, and vein, and at least a part of the body including a characteristic movement of the part of the body, and a feature of the entire body, such as a shape of the whole body and the characteristic movement.

First Exemplary Embodiment

FIG. 1 is a diagram illustrating a schematic configuration of a network system according to an exemplary embodiment for implementing a technology according to the present disclosure.

As illustrated in FIG. 1, a network system 1 includes an image forming apparatus 2 as an information processing apparatus. The image forming apparatus 2 is connected to an internal network 6. The internal network 6 is formed as a network such as Intranet, and the internal network 6 has a security level set to be higher than a security level of an external network INET described below.

The internal network 6 includes functions such as a firewall, for example, and is connected to a public network such as the Internet or the external network INET including an external communication line via a network connection device 5 such as a gateway.

Further, a user terminal 3 and an internal server 4 are connected to the internal network 6.

An external terminal 7 and an external server 8 are connected to the external network INET.

The user terminal 3, the internal server 4, and the image forming apparatus 2 connected to the internal network 6 are configured to enable data communication with each other via the internal network 6. Further, the external terminal 7, the external server 8, and the image forming apparatus 2 are configured to enable data communication with each other via the internal network 6.

FIG. 1 illustrates an example in which the user terminal 3 is connected to the internal network 6 and the external terminal 7 is connected to the external network INET. The present disclosure is not limited to connecting one user terminal to each network, and a plurality of terminal apparatuses may be connected to the network.

The network connection device 5 has a communication control function for controlling data communication. An example of the communication control function includes a function of limiting (for example, blocking) data communication between the internal network 6 and the external network INET only to a predetermined connection destination. Due to the limiting of the data communication in the network connection device 5, communication of the image forming apparatus 2, the user terminal 3, and the internal server 4 connected to the internal network 6 with the external network INET can be limited (for example, blocked).

Further, the internal network 6 is configured to be connectable to the external network INET via the network connection device 5, and is in a secure network environment in which only data communication between electronic devices connected to the internal network 6 can be performed. That is, the security level of the internal network 6 can be set higher than the security level of the external network INET.

Image Forming Apparatus

Figure 2:
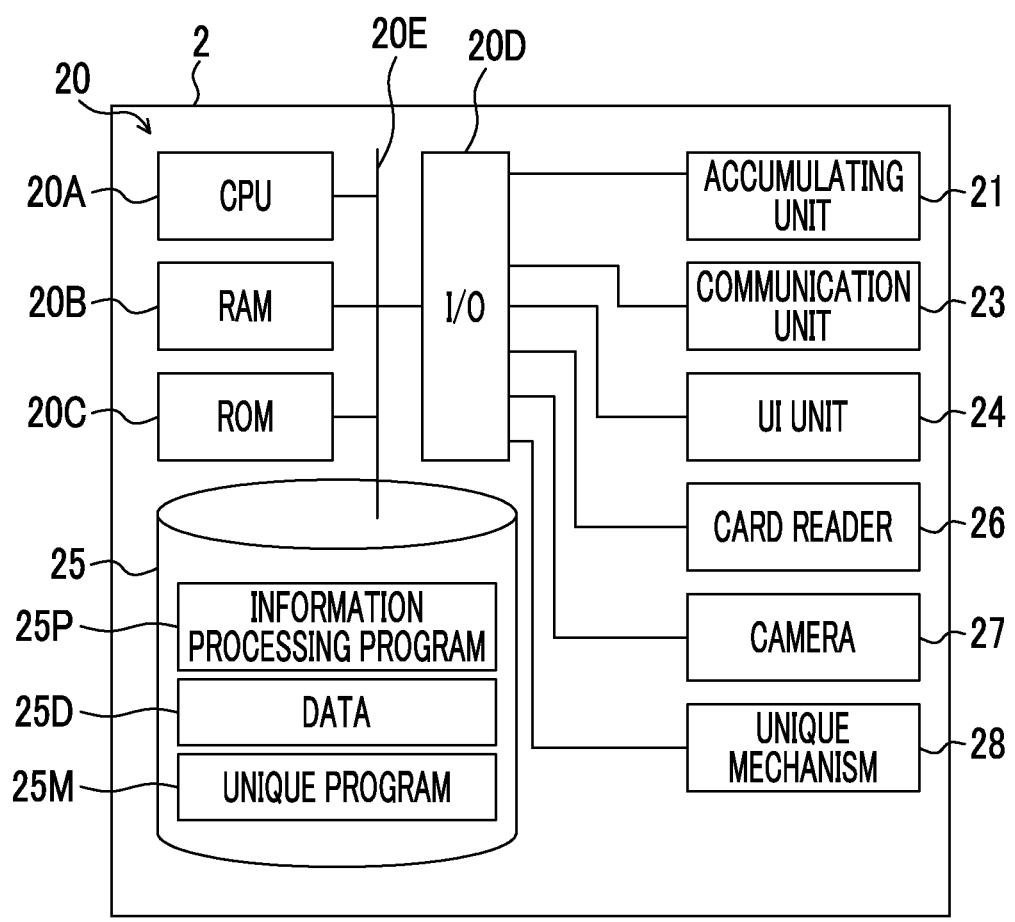
FIG. 2 is a block diagram illustrating an example of an electrical configuration of an image forming apparatus according to the exemplary embodiment.

Next, an example of a configuration of the image forming apparatus 2 will be described with reference to FIG. 2. FIG. 2 is a block diagram illustrating an example of an electrical configuration of the image forming apparatus according to the exemplary embodiment.

The image forming apparatus 2 includes a computer main body 20, and the computer main body 20 includes a central processing unit (CPU) 20A, a random access memory (RAM) 20B, a read-only memory (ROM) 20C, and an input and output port (I/O) 20D, which are connected to each other via a bus 20E. An auxiliary storage device 25 that can be realized by an HDD, a non-volatile flash memory, or the like is connected to the bus 20E.

An accumulating unit 21 for accumulating a job such as a print job is connected to the I/O 20D. In the accumulating unit 21, for example, the print job including print data instructed to be printed in the image forming apparatus 2 by the user terminal 3 connected to the internal network 6 can be accumulated.

Further, a communication unit 23 and a UI unit 24 such as a touch panel that enables operation input while displaying an image are connected to the I/O 20D. The UI unit 24 can function as a sensor that enables input of authentication information such as an ID and a password by a user operation, as an authentication method different from an ID card authentication method.

Further, a card reader 26 and a camera 27 to be used for an authentication process are connected to the I/O 20D. The card reader 26 is a first sensor for executing processing of authenticating a user by a first authentication method. The camera 27 is a second sensor for executing processing of authenticating the user by a second authentication method different from the first authentication method.

In the present exemplary embodiment, as an example of the first authentication method, an ID card authentication method in which a user authentication is executed by an identification (ID) card possessed by the user is used. The card reader 26, which is the first sensor according to the first authentication method, acquires information registered in the ID card. In the first authentication method, that is, in the ID card authentication method, the authentication information is acquired from the ID card in which the authentication information such as an ID and a password for identifying the user is recorded, the acquired authentication information is collated with authentication information registered in advance, and whether or not the authentication succeeds is discriminated. The first authentication method is not limited to the ID card authentication method, and may be any authentication method for authenticating the user in an identifiable manner. For example, as an authentication method different from the ID card authentication method exemplified as the first authentication method, a password authentication method in which authentication information such as a password or an ID is input by a user operation of the UI unit 24 may be used.

Further, in the present exemplary embodiment, a biometric authentication method is used as an example of the second authentication method, and a face authentication method is used among the biometric authentication methods. A camera, which is the second sensor according to the second authentication method, acquires a face image which is information indicating a physical feature of a user, which is different for an individual user. In the second authentication method, that is, in the face authentication method, the user's face is imaged, biometric information indicating feature points of the face and a feature line connecting the feature points is extracted as authentication information from the captured image, the extracted authentication information is collated with authentication information registered in advance, and whether or not the authentication succeeds is discriminated. The second authentication method is not limited to the face authentication method, and may be an authentication method for authenticating the user in an identifiable manner by an authentication method different from the first authentication method. For example, another example of the biometric authentication method includes an authentication method using biometric information of a part of the body such as a fingerprint, an iris, and a vein. The second authentication method described above can be used in a case where a security level is higher than a security level of the first authentication method.

Further, the image forming apparatus 2 has an image processing function, and includes a unique mechanism 28 in order to realize this image processing function. Specifically, an example of the image processing function includes an image copying function of copying a document, an image forming function including an image printing function of printing input data of the document, and an image scanning function of reading (scanning) the document as an image and performing data-conversion. In addition, an example of the unique mechanism 28 is a scanner that scans the document and a printer that prints various types of data.

The auxiliary storage device 25 stores an information processing program 25P for causing the image forming apparatus 2 to function as an information processing apparatus according to the present disclosure. The CPU 20A reads the information processing program 25P from the auxiliary storage device 25 and expands the information processing program 25P into the RAM 20B to execute processing. As a result, the image forming apparatus 2 that executes the information processing program 25P operates as the information processing apparatus according to the present disclosure. The information processing program 25P includes an authentication process for executing authentication processing by the first authentication method and the second authentication method. Further, the information processing program 25P may be provided by a recording medium such as a CD-ROM.

In addition, the auxiliary storage device 25 stores various types of data 25D to be used in the image forming apparatus 2, and also stores a unique program 25M for realizing the image processing function of the image forming apparatus 2. The CPU 20A reads the unique program 25M from the auxiliary storage device 25 and expands the unique program 25M into the RAM 20B to executes processing. As a result, the image forming apparatus 2 that executes the unique program 25M operates to be able to execute the image processing function including the image forming function and the image scanning function.

Figure 3:
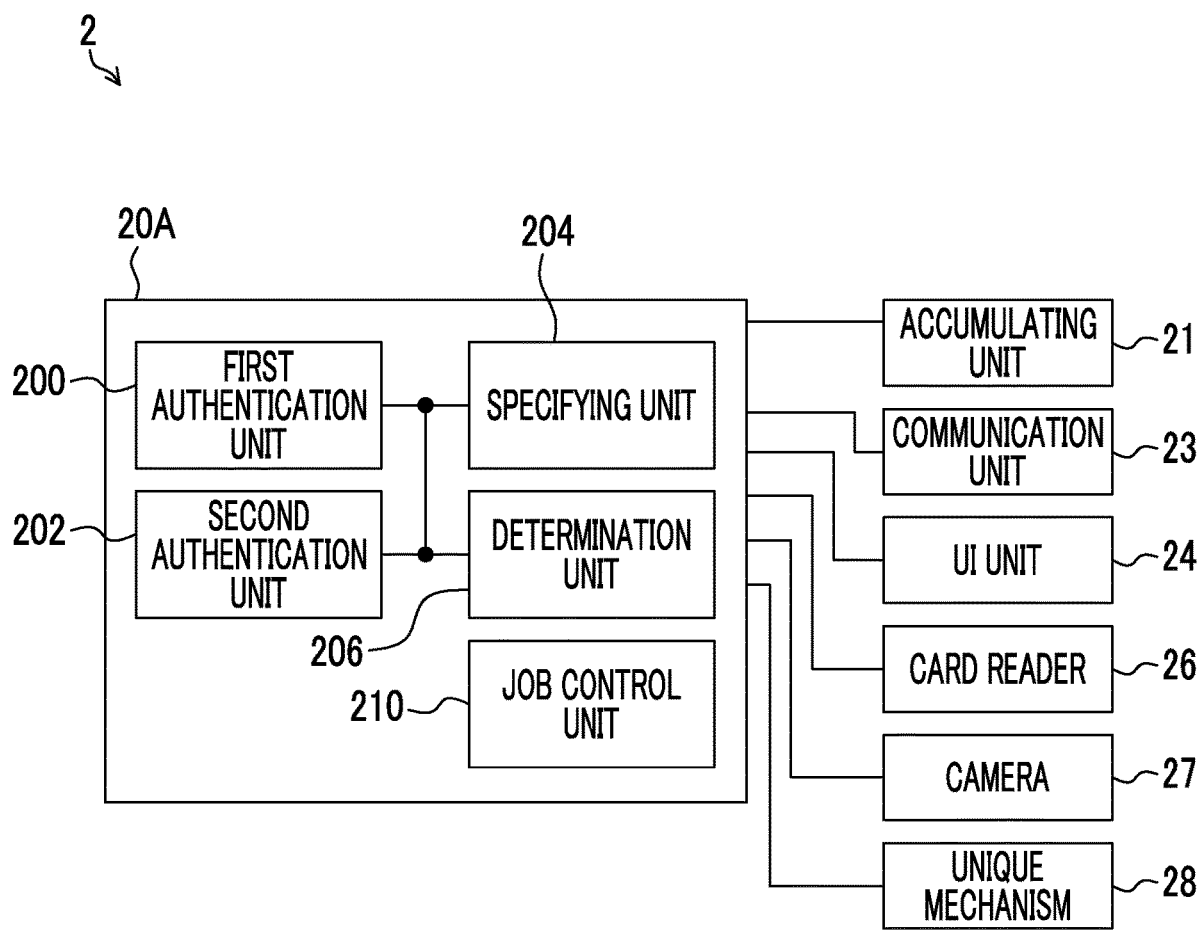
FIG. 3 is a block diagram illustrating an example of a functional configuration of the image forming apparatus according to the exemplary embodiment.

FIG. 3 is a block diagram illustrating an example of a functional configuration of the image forming apparatus 2 according to the present exemplary embodiment.

As illustrated in FIG. 3, the CPU 12A of the image forming apparatus 2 according to the present exemplary embodiment functions as an information processing apparatus by the information processing program 25P being executed. The information processing apparatus includes functional units that respectively function as a first authentication unit 200, a second authentication unit 202, a specifying unit 204, a determination unit 206, and a job control unit 210.

The first authentication unit 200 is a functional unit that executes an authentication process by the first authentication method, and in the present exemplary embodiment, a case of executing the processing of authenticating a user by an ID card authentication method will be described as an example. It is assumed that information such as an ID and a password is registered in advance in the first authentication unit 200 as reference authentication information for authenticating the user by the first authentication method. Therefore, the first authentication unit 200 acquires the authentication information such as the ID and the password from an ID card possessed by the user with the card reader 26 which is the first sensor, and collates the acquired authentication information with the registered reference authentication information to discriminate whether or not the authentication succeeds.

The first authentication unit 200 can have the authentication process in which a plurality of authentication methods are executed. For example, the ID card authentication method and a password authentication method of the authentication method different from the ID card authentication method are included, and any of the ID card authentication method and the password authentication method can be executed.

The second authentication unit 202 is a functional unit that executes an authentication process by the second authentication method different from the first authentication method. In the present exemplary embodiment, a case of executing the processing of authenticating the user by the face authentication method among the biometric authentication methods is performed will be described as an example. It is assumed that biometric information for each user is registered in advance in the second authentication unit 202 as reference authentication information for authenticating the user by the face authentication method. Therefore, the second authentication unit 202 extracts biometric information indicating feature points of the face and a feature line connecting the feature points from a face image of the user imaged by the camera 27, which is the second sensor, as authentication information, the extracted authentication information is collated with the registered reference authentication information to discriminate whether or not the authentication succeeds.

The specifying unit 204 is a functional unit that instructs the first authentication unit 200 or the second authentication unit 202 to execute the authentication process, and specifies a user of which authentication succeeds as an authenticated user in a case where the authentication succeeds. In addition, the specifying unit is also a functional unit that specifies a job (for example, a print job) instructed to be executed by the user specified by the specifying unit 204, that is, the authenticated user.

The determination unit 206 is a functional unit that determines a security level of the job (for example, the print job) instructed to be executed by the authenticated user who is the user specified by the specifying unit 204. The determination unit 206 is also a functional unit that executes an instruction to perform additional authentication according to the determination result and determines whether or not the additional authentication succeeds.

In the present exemplary embodiment, the determination unit 206 determines whether or not the job requires tracking according to a predetermined determination condition as the determination of the security level of the job. An example of the determination condition includes a condition in which the job requires tracking in a case where the job includes information indicating that at least a part of data included in the job is transmitted to the external network INET via the internal network 6. In a case where the data is transmitted to the external network INET in which security may not be ensured, for example, it is preferable that a certain security level by targeting the job is ensured as a protection target in this condition. When executing the job that requires tracking, for example, in order to ensure security, it is preferable that a user authentication by a biometric authentication, which has a higher security level than a security level of the ID card authentication, succeeds.

Specifically, in a case where execution of the job is instructed by the authenticated user, in a case where a security level of the authentication method in a case where the authenticated user is authenticated is lower than a security level of the job, the determination unit 206 performs an instruction of performing additional authentication using an authentication method having the higher security level. That is, regarding the security level of the job, the determination unit 206 determines whether or not the job is a job that requires tracking according to a determination condition, and performs an instruction to perform additional authentication according to the determination result. In a case where the target job is a job that requires tracking, the job requests a security level equal to or higher than a security level of a biometric authentication as the authenticated user. Therefore, in the job that requires tracking, in a case where the authenticated user is authenticated by the ID card authentication or the password authentication, the security level of the job is lower than the security level of the authenticated user, so that additional authentication to the second authentication unit 202 that executes the face authentication is instructed.

On the other hand, in a case where the authentication previously performed is equal to or higher than the security level of the job, the instruction to perform the additional authentication can be omitted. Specifically, in a case where the authentication method of the authenticated user is a face authentication, the instruction to perform the additional authentication to the second authentication unit 202 that executes the face authentication is omitted.

The job control unit 210 is a functional unit that controls processing of a job instructed to be executed by the authenticated user. The job control unit 210 controls to process the job according to a determination result in the determination unit 206. That is, for the job that requires tracking, the processing is executed on the job in a case where the biometric authentication which is the face authentication succeeds, and is canceled in a case where the biometric authentication does not succeed. On the other hand, for a job that does not require tracking, processing is executed on the job.

The first authentication unit 200 is an example of a functional unit that executes the first authentication process according to the present disclosure. The second authentication unit 202 is an example of a functional unit that executes the second authentication process according to the present disclosure.

User Terminal

Figure 4:
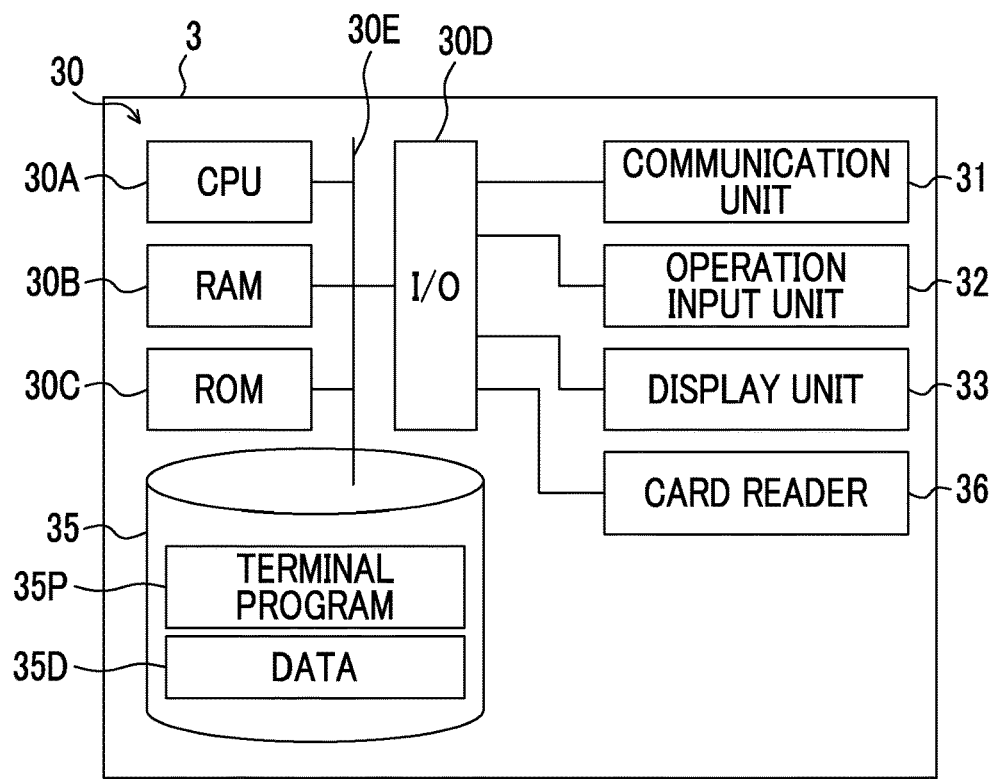
FIG. 4 is a block diagram illustrating an example of a configuration of a user terminal according to the exemplary embodiment.

Next, a configuration of the user terminal 3 will be described with reference to FIG. 4. The user terminal 3 is a terminal apparatus operated by a user for executing a job via the internal network 6. A general-purpose computer apparatus such as a personal computer (PC) is applied to the user terminal 3.

The user terminal 3 includes a computer main body 30, and the computer main body 30 includes a CPU 30A, a RAM 30B, a ROM 30C, and an I/O 30D, which are connected to each other via a bus 30E. An auxiliary storage device 35 that can be realized by an HDD, a non-volatile flash memory, or the like is connected to the bus 30E. Further, a communication unit 31 that communicates with an external apparatus, an operation input unit 32 for the user to confirm a display and input an operation, and a display unit 33 are connected to the I/O 30D.

A terminal program 35P can be stored in the auxiliary storage device 35. The user terminal 3 reads the terminal program 35P from the auxiliary storage device 35, expands the terminal program 35P into the RAM 30B to executes processing. As a result, the user terminal 3 that executes the terminal program 35P operates as an apparatus that gives an instruction to execute a job.

Further, the auxiliary storage device 35 stores various types of data 35D used in the user terminal 3.

A card reader 36 can be connected to the I/O 30D described above. The card reader 36 is an apparatus used for an authentication process for authenticating a user who can operate the user terminal 3. In a case where only a predetermined user can operate the user terminal 3, the card reader 36 is unnecessary. Further, in order to increase an authentication level (that is, a security level) for authenticating the user who can operate the user terminal 3, a camera may be connected and the user may be authenticated by a biometric authentication method such as a face authentication.

Since the external terminal 7 connected to the external network has approximately the same configuration as the user terminal 3, detailed description thereof will not be repeated.

Server

Figure 5:
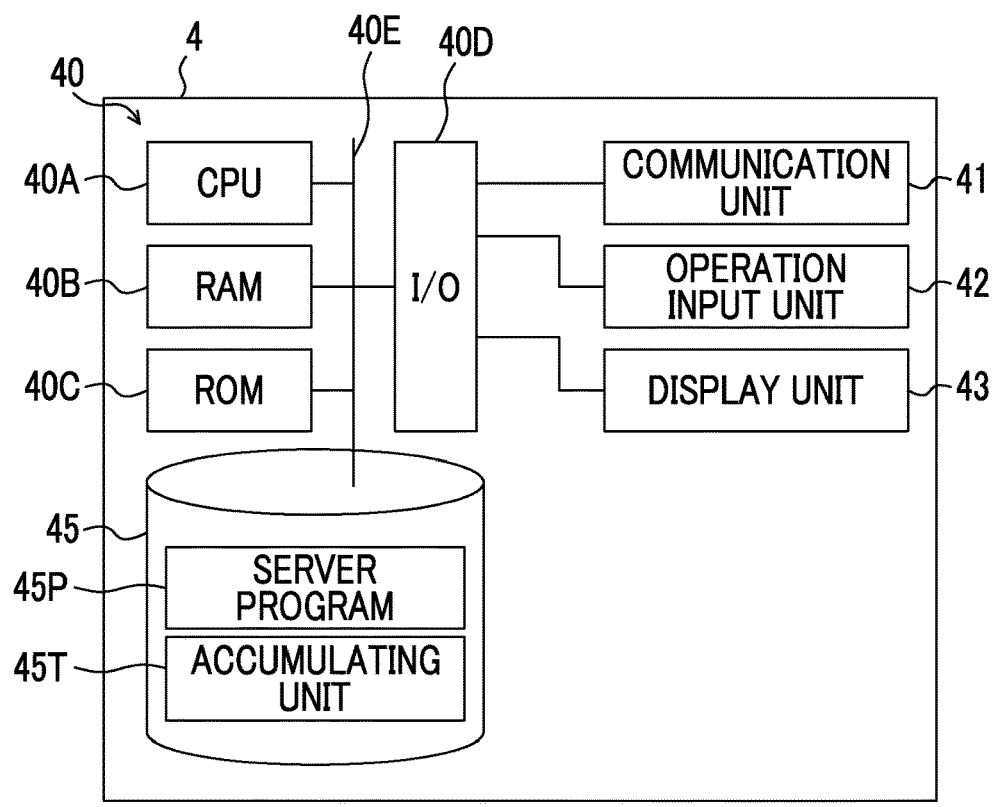
FIG. 5 is a block diagram illustrating an example of a server configuration according to the exemplary embodiment.

Next, an example of a configuration of the internal server 4 will be described with reference to FIG. 5.

The internal server 4 is an example of a server that is connected to the internal network 6 and has a function of accumulating print jobs from, for example, the user terminal 3 via the internal network 6. The internal server 4 includes a computer main body 40, and the computer main body 40 includes a CPU 40A, a RAM 40B, a ROM 40C, and an I/O 40D, which are connected to each other via a bus 40E. An auxiliary storage device 45 that can be realized by an HDD, a non-volatile flash memory, or the like is connected to the bus 40E. Further, a communication unit 41 that communicates with an apparatus on the internal network 6, an operation input unit 42 for inputting an operation by a user, and a display unit 43 are connected to the I/O 40D.

A server program 45P can be stored in the auxiliary storage device 45. The internal server 4 reads the server program 45P from the auxiliary storage device 45 and expands the server program 45P into the RAM 40B to execute processing. Further, the auxiliary storage device 45 includes an accumulating unit 45T that accumulates a job instructed by the user terminal 3. As a result, the internal server 4 that executes the server program 45P operates as an apparatus that accumulates the job from the user terminal 3 in the accumulating unit 45T.

The internal server 4 also has a function of accumulating the job from the user terminal 3 in the accumulating unit 45T and transmitting the accumulated job to the accumulating unit 21 of the image forming apparatus 2 via the communication unit 41 and the internal network 6.

The external server 8 is an example of a server that is connected to the external network INET and has a function of accumulating the job from, for example, the external terminal 7 via the external network INET. Since in the external server 8, a network as a connection destination is only replaced with the external network INET and the external server 8 has the same configuration as the internal server 4, the description thereof will not be repeated.

Information Processing Program

Next, an information process executed by the image forming apparatus 2 will be described.

It is assumed that information such as an ID and a password is already registered in the image forming apparatus 2 as reference authentication information for authenticating a user by the first authentication method, that is, card authentication. Further, it is assumed that biometric information for each user is registered in the image forming apparatus 2 as reference authentication information for authenticating the user by the second authentication method different from the first authentication method, that is, a face authentication method. Further, the accumulating unit 21 of the image forming apparatus 2 may accumulate a part of data for executing a job by operating the user terminal 3.

Figure 6:
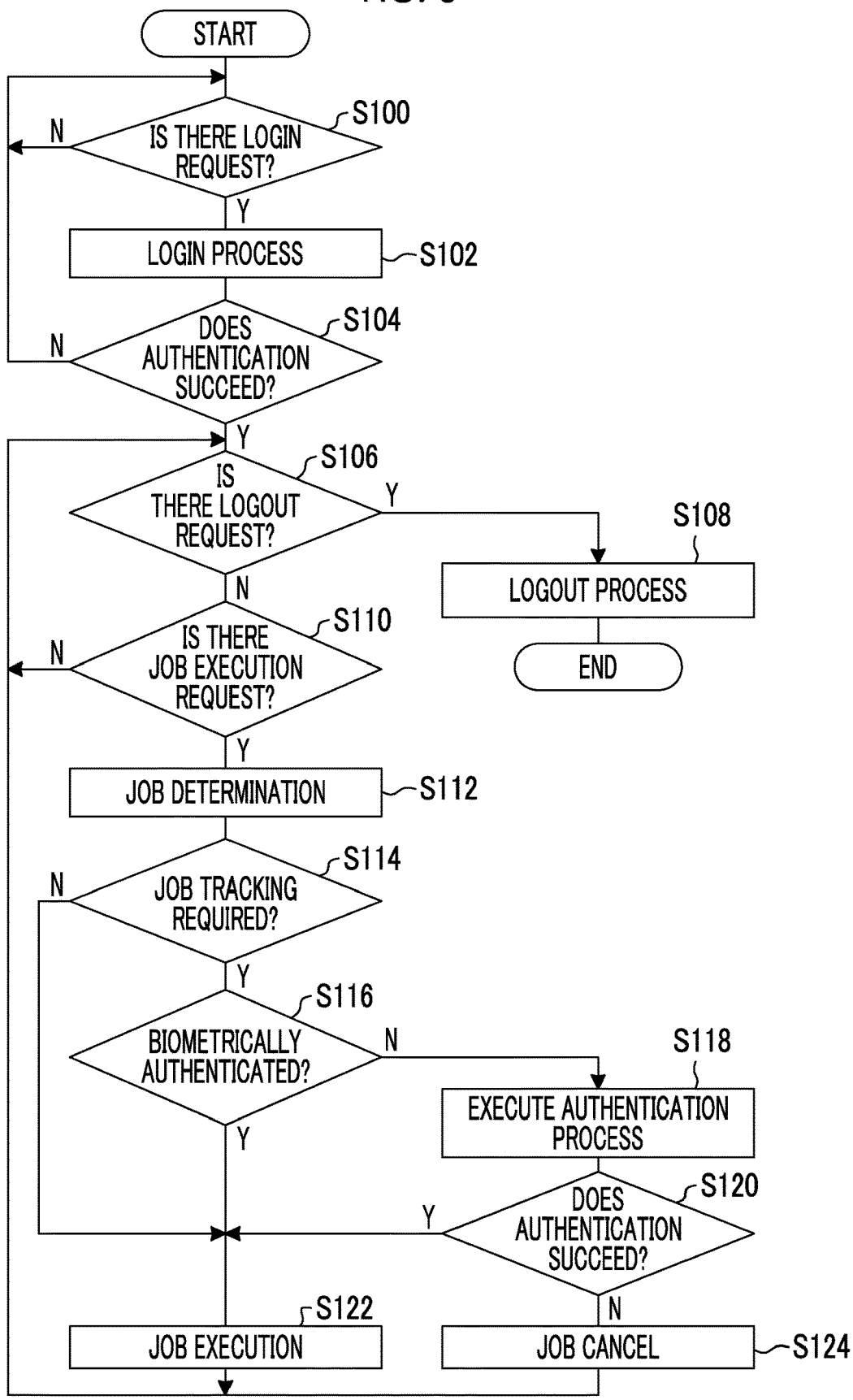
FIG. 6 is a flowchart illustrating an example of a flow of an information process executed in the image forming apparatus according to the exemplary embodiment.

FIG. 6 is a flowchart illustrating an example of a flow of an information process executed by the image forming apparatus 2. A processing routine illustrated in FIG. 6 is an example of a processing flow of the information processing program 25P stored in the image forming apparatus 2. The processing routine illustrated in FIG. 6 is executed by the CPU 20A in the image forming apparatus 2.

First, the CPU 20A executes a login process for permitting the user to use the image forming apparatus 2. Specifically, the CPU 20A determines whether or not there is a login request from the user, repeats a negative determination until there is the login request, and makes a positive determination in a case where there is the login request, in step S100, and executes a login process, in step S102. The login process is a process for authenticating the user.

In the present exemplary embodiment, a user authentication by the first authentication method is executed. Specifically, first, the card reader 26 acquires an ID and a password as authentication information for the card authentication. Next, the user authentication is executed by collating the acquired ID and password, which are the authentication information, with an ID and a password, which are registered basic authentication information. It is determined whether or not the authentication succeeds. That is, in a case where the acquired authentication information coincides with the basic authentication information, it is determined that the authentication succeeds, and in a case where the acquired authentication information does not coincide with the basic authentication information, it is determined that the authentication does not succeed.

Next, in step S104, the CPU 20A determines whether or not the authentication succeeds based on the determination result in step S102. In a case where it is determined that the authentication succeeds in step S102, a positive determination is made in step S104, the user authenticated by the first authentication method is specified as an authenticated user, and the processing proceeds to step S106. Specifically, as a result of specifying the user, an ID indicating the authenticated user is temporarily stored, and the processing proceeds to step S106.

On the other hand, in a case where the authentication does not succeed, the CPU 20A returns the processing to step S100 since the user is not permitted to use the image forming apparatus 2. In this case, it is possible to perform display control for displaying information indicating that the login process does not succeed on the UI unit 24. As a result, it is possible to make the user, on which the authentication is performed, confirm information such as incomplete user registration in a case where the authentication fails, for example.

In the above description, the case where the user authentication by the ID card authentication method is executed as the first authentication method, as the login process is described, and the present exemplary embodiment is not limited to this. The user authentication by at least one of the first authentication method or the second authentication method may be executed. For example, in the present exemplary embodiment, the login process may be executed by any one of authentication by an ID card authentication method using an ID card, password authentication by operating the UI unit 24, and a face authentication using a face image of the user's face. Further, the login process may be executed by a plurality of authentications by combining these plurality of authentications.

In step S106, the CPU 20A determines whether or not there is a logout request from the user, and in a case where a positive determination is made, in step S108, the present processing routine is terminated after executing a logout process such as deleting temporarily stored information. On the other hand, in a case where a negative determination is made in step S106, the CPU 20A shifts the processing to step S110.

In step S106, a positive determination may be made in step S106, assuming that the user's operation by the UI unit 24 is non-operation during a predetermined time and the logout request is made after the predetermined time elapses, for example.

In step S110, the CPU 20A determines whether or not there is a job execution request from the user's operation by the UI unit 24, returns the processing to step S106 in a case of a negative determination, and shifts the processing to step S112 in a case of a positive determination.

In step S112, the CPU 20A executes job determination on a job of which execution is requested. This job determination is a process of determining whether or not the job requires tracking according to a determination condition. In the present exemplary embodiment, the determination condition is a condition in which the job requires tracking in a case where the job includes information indicating that at least a part of data included in the job is transmitted to the external network INET via the internal network 6.

Figure 7:
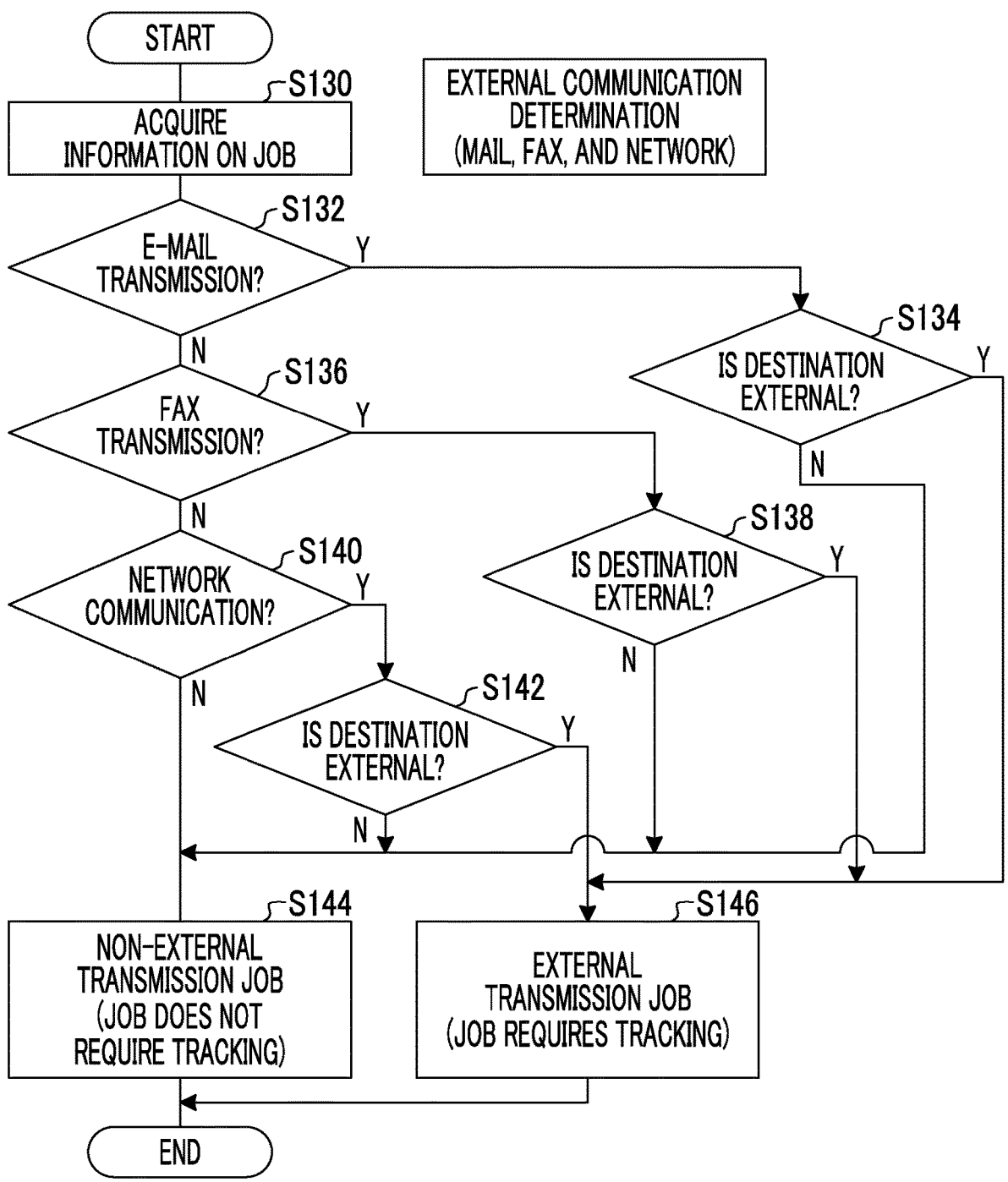
FIG. 7 is a flowchart illustrating an example of a flow of a job determination process according to the exemplary embodiment.

FIG. 7 is a flowchart illustrating an example of a flow of a job determination process executed in step S112. A processing routine illustrated in FIG. 7 is an example of a process flow included in processing of the information processing program 25P stored in the image forming apparatus 2.

As illustrated in FIG. 7, in the job determination process, the CPU 20A acquires information on a job of which execution is requested (hereinafter, referred to as a target job) in step S130. An example of the information on the job acquired in step S130 includes attribute information related to data included in the target job and processing information indicating processing by the CPU 20A using the data. The attribute information includes format information such as a format and a form of the target job or the data included in the target job. Further, the processing information includes information indicating that the data is transmitted by e-mail, information indicating that the data is transmitted by a facsimile machine, and information indicating that the data is transmitted on a network.

Next, the CPU 20A determines whether or not the acquired information on the target job includes processing information indicating e-mail transmission in step S132, and determines whether or not a destination of the e-mail is external in step S134, in a case of a positive determination. The determination in step S134 may determine whether or not an address of the e-mail destination includes an address or a domain of the external terminal 7 or the external server 8 via the external network INET.

In a case where a negative determination is made in step S134 and the data is to be transmitted to the user terminal 3 or the internal server 4 via the internal network 6, the target job is determined to be a non-external transmission job, that is, a job that does not require job tracking in step S144, and the present processing routine is terminated. In a case where a positive determination is made in step S134 and the data is to be transmitted to the external terminal 7 or the external server 8 via the external network INET, the target job is determined to be an external transmission job, that is, a job that requires the job tracking in step S146, and the present processing routine is terminated.

In a case of a negative determination in step S132, it is determined whether or not the acquired information of the target job includes processing information indicating facsimile transmission in step S136, and in a case of a positive determination, it is determined whether or not a destination of the facsimile transmission is external, in step S138. The determination in step S138 may determine whether or not a destination address or a destination number of the facsimile transmission includes an address or a reception number of the external terminal 7 or the external server 8 via the external network INET.

In a case where a negative determination is made in step S138, it is determined that the target job is a job that does not require job tracking in step S144, in a case where a positive determination is made, it is determined that the target job is a job that requires job tracking in step S146, and the present processing routine is terminated.

In a case of a negative determination in step S136, it is determined whether or not the acquired information of the target job includes processing information indicating network transmission in step S140, and in a case of a positive determination, it is determined whether or not a destination of the network transmission is external, in step S142. The determination in step S142 may be destination of whether or not information indicating the destination of the network transmission includes an internet protocol (IP) address and a uniform resource locator (URL) of the external terminal 7 or the external server 8 via the external network INET.

In a case where a negative determination is made in step S142, it is determined that the target job is a job that does not require job tracking in step S144, in a case where a positive determination is made, it is determined that the target job is a job that requires job tracking in step S146, and the present processing routine is terminated.

As described above, in a case where the job determination for the target job is executed, the CPU 20A returns the processing to the processing routine illustrated in FIG. 6, and determines whether or not the target job requires job tracking, in step S114.

In a case where the target job does not require job tracking, the CPU 20A shifts the processing to step S122, performs job execution of the target job, and returns the processing to step S106.

In a case where the target job requires job tracking, the CPU 20A shifts the processing to step S116, and determines whether or not the authenticated user is biometrically authenticated by a face authentication. In a case where a biometric authentication is completed, security is ensured, so that the CPU 20A makes a positive determination in step S116, performs job execution of the target job in step S122, and returns the processing to step S106.

On the other hand, in a case where the authenticated user is not biometrically authenticated, security is not ensured, so that the CPU 20A makes a negative determination in step S116 and shifts the processing to step S118. In step S118, the CPU 20A executes an authentication process of a biometric authentication by a face authentication, and determines whether or not the biometric authentication, that is, the authentication by the face authentication succeeds, in the next step S120. In a case where the biometric authentication by the face authentication succeeds, a positive determination is made in step S120, and job execution of the target job is performed in step S122. On the other hand, in a case where the authentication by the face authentication does not succeed, it is difficult to ensure security for the target job, so that the CPU 20A cancels execution of the target job in step S124 and returns the processing to step S106.

In a case where the CPU 20A determines that the target job requires job tracking in step S114, the CPU 20A starts recording a monitoring log as information indicating an operation history of the target job. The recording is continued until processing of job execution (step S122) or job cancellation (step S124) of the target job is completed. An example of the information indicating the operation history of the target job recorded in this monitoring log includes identification information indicating the executed process, a date and time at execution of the processing, a user name (ID) of the authentication process, an authentication result, and information related to a job such as a face image which is biometric information in a case of a face authentication.

The processing in steps S100 to S120 is an example of the functions of the first authentication unit 200, the second authentication unit 202, and the determination unit 206 illustrated in FIG. 3. The processing in steps S122 and S124 is an example of the function of the job control unit 210 illustrated in FIG. 3.

As described above, according to the present exemplary embodiment, in a case where the target job requires job tracking and a security level of the authentication process performed for authenticating the authenticated user is lower than a security level of the target job, a user authentication by a biometric authentication such as a face authentication is added and executed. The job can be executed only in a case where the biometric authentication such as a face authentication succeeds, and the security for the target job can be ensured. Further, in a case where the user is an authenticated user by the biometric authentication such as a face authentication, an additional authentication is not executed, so that a burden on the user can be reduced. Therefore, as compared with the case where a plurality of authentications are always performed and the case where only one authentication is always performed, it is possible to reduce the burden on the user and suppress a decrease in the security level for the job to ensure security.

Second Exemplary Embodiment

Next, a second exemplary embodiment will be described. Since the second exemplary embodiment has the same configuration as the first exemplary embodiment, identical parts are designated by identical reference numerals and detailed description thereof will not be repeated.

In the first exemplary embodiment, the case where a part of data is transmitted to the outside of the target job, it is determined that the job requires tracking, and a biometric authentication is executed as additional authentication is described. Meanwhile, in the target job, the user intentionally or automatically according to the processing environment of the user, the job or a part of the data included in the job may be set to be confidential. In this case, in a case where the part of the data is transmitted to the outside, it may not be sufficient to determine that the job requires tracking.

For example, the image forming apparatus 2 has an image scanning function, and so it is conceivable to perform an instruction for executing a job of reading (scanning) a document as an image and transmitting data (scan data) obtained by data-conversion to the outside of the image forming apparatus 2 such as the user terminal. Meanwhile, in a case where information indicating that the document is confidential is recorded in the document, or in a case where information indicating that the scan data is confidential is given to the scan data, in a case where the information indicating that the document is confidential is not taken into consideration and the scan data is transmitted, it may be difficult to ensure security.

Therefore, in the second exemplary embodiment, the image forming apparatus 2 having the image scanning function is taken as an example, and a case of providing an image forming apparatus capable of ensuring security in a case where a job or a part of data included in the job is set to be confidential will be described.

Next, an operation of the image forming apparatus 2 according to the second exemplary embodiment will be described with reference to FIG. 8.

Figure 8:
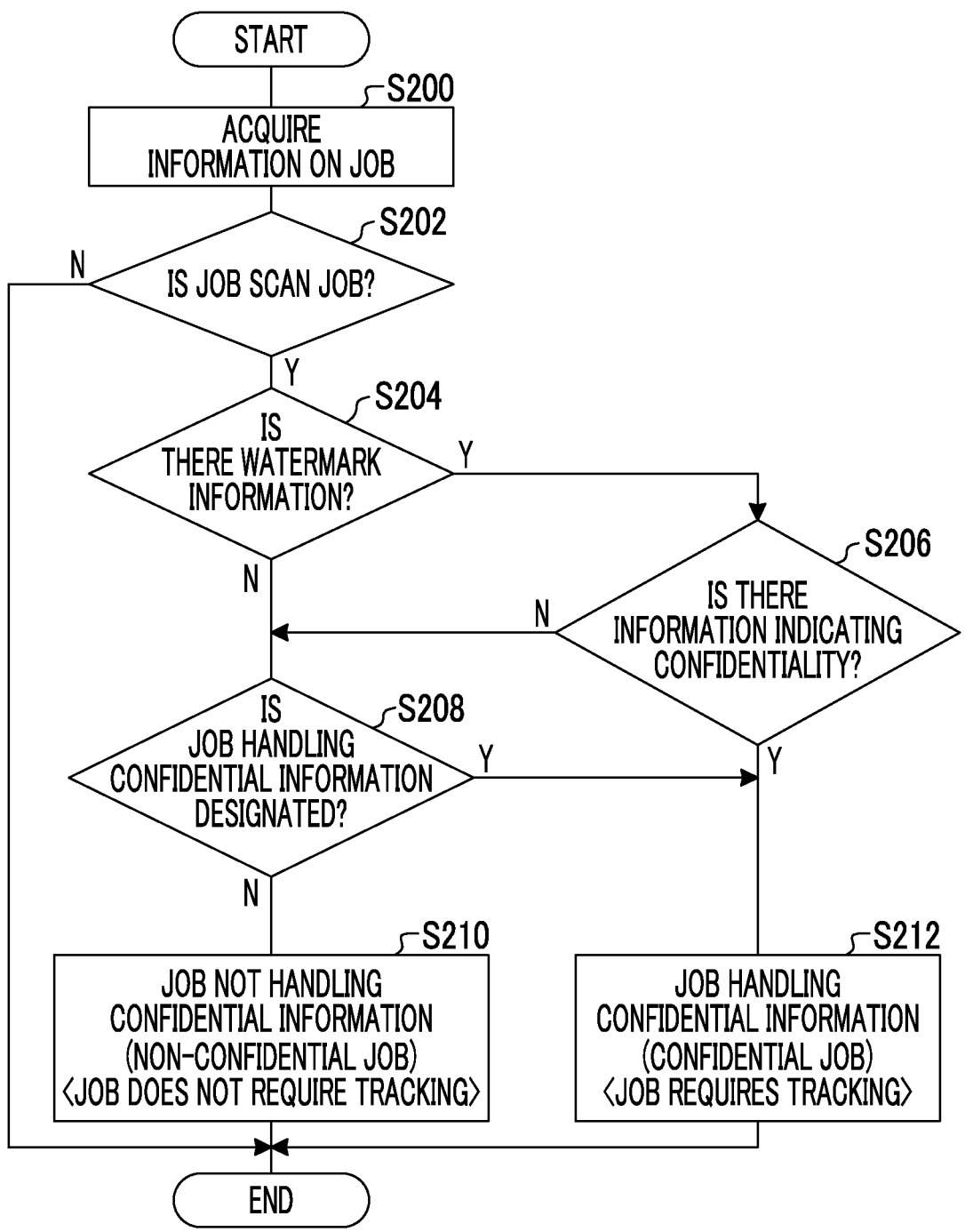
FIG. 8 is a flowchart illustrating an example of a flow of an information process executed in an image forming apparatus according to another exemplary embodiment.

FIG. 8 is a flowchart illustrating an example of a processing flow by an information processing program according to the second exemplary embodiment. The information processing program according to the second exemplary embodiment is an example of a processing flow for a job (hereinafter, referred to as a scan job) that executes an image scanning function in the image forming apparatus 2. The flowchart illustrated in FIG. 8 is an example of a flow of a job determination process executed in step S112 illustrated in FIG. 6.

The information processing program illustrated in FIG. 8 may be executed in place of the processing routine illustrated in FIG. 7, or may be executed in combination with the processing routine illustrated in FIG. 7.

Further, in the present exemplary embodiment, it is possible to determine that the scan job is a job that handles confidential information from job information for the scan job. For example, the image forming apparatus 2 is configured to enable data-conversion so that information indicating a document is confidential is recorded in the document and scan data includes the information indicating confidentiality. Alternatively, the image forming apparatus 2 is configured to enable data-conversion so that the scan job includes information indicating that the scan job is confidential.

As illustrated in FIG. 8, in the job determination process, the CPU 20A acquires information on the target job (the scan job in the present exemplary embodiment) for which execution is requested in step S200, in the same manner as step S130 illustrated in FIG. 7. An example of the information on the scan job acquired in step S200 includes attribute information related to the scan data and processing information indicating a transmission process for the scan data. The attribute information can include, for example, watermark information embedded in the document, information indicating confidentiality, and information indicating job designation for handling confidential information.

Next, in step S202, the CPU 20A determines whether or not the acquired information of the job includes processing information indicating the transmission process for the scan data, and terminates the present processing routine in a case of a negative determination. In a case where a positive determination is made in step S202, it is determined whether or not there is watermark information in step S204. The determination in step S204 may determine whether or not the attribute information includes the watermark information.

In a case where a negative determination is made in step S204, the CPU 20A determines whether or not there is a job designation that handles confidential information for the scan job, in step S208. The determination in step S204 may be determination of whether or not the attribute information includes information indicating the job designation for handling confidential information. In a case where a negative determination is made in step S208, the CPU 20A determines that the scan job is a non-confidential job that does not handle the confidential information and does not require job tracking in step S210, and terminates the present processing routine. On the other hand, in a case where a positive determination is made in step S208, the CPU 20A determines that the scan job is a confidential job that handles the confidential information and requires job tracking in step S212, and terminates the present processing routine.

In a case where the scan job has watermark information, a positive determination is made in step S204, and the CPU 20A determines whether or not there is information indicating confidentiality in step S206. The determination in step S206 may be determination of whether or not the attribute information includes the information indicating confidentiality. In a case where a positive determination in step S206, the CPU 20A shifts the processing to step S212, and in a case where a negative determination is made, the CPU 20A shifts the processing to step S208.

As described above, in a case where the job determination for the target job is executed, the CPU 20A returns the processing to the processing routine illustrated in FIG. 6, determines whether or not the target job requires job tracking in step S114, and executes the subsequent processing.

As described above, in the present exemplary embodiment, in a case where the scan job includes information indicating confidentiality and in a case where the scan job is a job that handles confidential information, it is determined that the target job (that is, the scan job) is a job that requires job tracking. As a result, it is possible to ensure security for the scan job that handles scan data scanned and converted into data by the image forming apparatus 2, while considering that the scan data is confidential.

Third Exemplary Embodiment

Next, a third exemplary embodiment will be described. The following is a modification example of the second exemplary embodiment. Since the third exemplary embodiment has the same configuration as the configurations of the first exemplary embodiment and the second exemplary embodiment, identical parts are designated by identical reference numerals and detailed description thereof will not be repeated.

Therefore, in the second exemplary embodiment, the image forming apparatus 2 having the image scanning function is taken as an example, and a case of providing an image forming apparatus capable of ensuring security in a case where a job or a part of data included in the job is set to be confidential is described. Therefore, in the third exemplary embodiment, the image forming apparatus 2 having an image forming function including the image printing function is taken as an example, and a case of providing an image forming apparatus capable of ensuring security in a case where a job or a part of data included in the job is set to be confidential will be described.

Next, an operation of the image forming apparatus 2 according to the third exemplary embodiment will be described with reference to FIG. 9.

Figure 9:
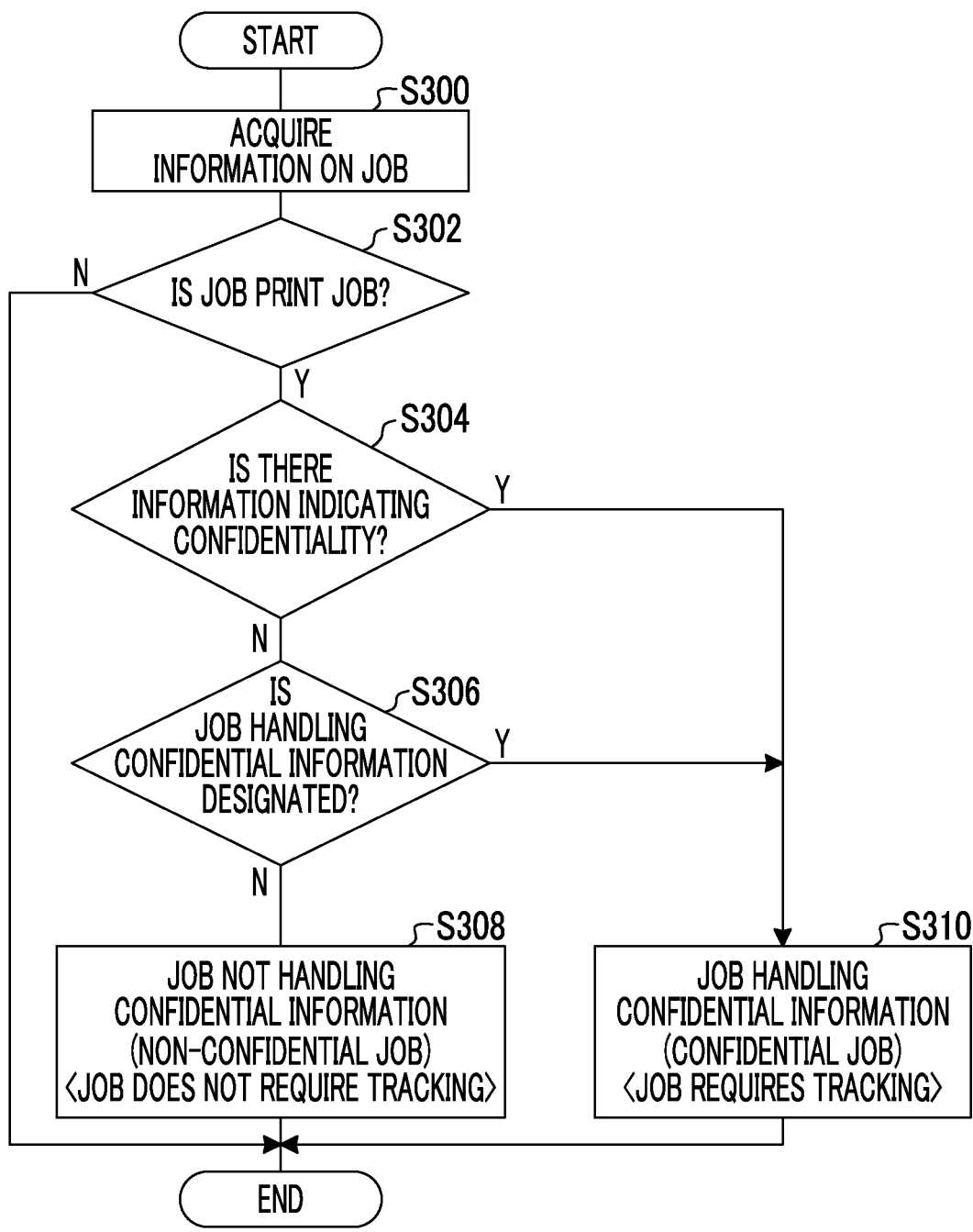
FIG. 9 is a flowchart illustrating an example of a flow of an information process executed in an image forming apparatus according to still another exemplary embodiment.

FIG. 9 is a flowchart illustrating an example of a processing flow by an information processing program according to the third exemplary embodiment. The information processing program according to the third exemplary embodiment is an example of a processing flow for a job (hereinafter, referred to as a print job) that executes an image forming function in the image forming apparatus 2. The flowchart illustrated in FIG. 9 is an example of a flow of a job determination process executed in step S112 illustrated in FIG. 6.

The information processing program illustrated in FIG. 9 may be executed in place of the processing routine illustrated in FIG. 7, or may be executed in combination with any one of the processing routine illustrated in FIG. 7 and the processing routine illustrated in FIG. 8.

Further, in the present exemplary embodiment, it is possible to determine that the print job is a job that handles confidential information, from job information for the print job. For example, the print job includes information indicating confidentiality.

As illustrated in FIG. 9, in the job determination process, the CPU 20A acquires information on the target job (the print job in the present exemplary embodiment) for which execution is requested in step S300, in the same manner as step S130 illustrated in FIG. 7. An example of the information of the print job acquired in step S300 includes attribute information related to the print data and processing information indicating an image forming process for the print data. The attribute information can include, for example, information indicating confidentiality, and information indicating job designation for handling confidential information.

Next, in step S302, the CPU 20A determines whether or not the acquired information of the job includes processing information indicating the image forming process for the print data, and terminates the present processing routine in a case of a negative determination. In a case where a positive determination is made in step S302, it is determined whether or not the print job has information indicating confidentiality in step S304. The determination in step S304 may be determination of whether or not the attribute information includes the information indicating confidentiality. In a case where a positive determination is made in step S304, the CPU 20A shifts the processing to step S310.

In a case where a negative determination is made in step S304, the CPU 20A determines whether or not there is a job designation that handles confidential information for the print job, in step S306. The determination in step S306 may be determination of whether or not the attribute information includes information indicating the job designation for handling confidential information. In a case where a negative determination is made in step S306, the CPU 20A determines that the print job is a non-confidential job that does not handle the confidential information and does not require job tracking in step S308, and terminates the present processing routine. On the other hand, in a case where a positive determination is made in step S306, the CPU 20A determines that the print job is a confidential job that handles the confidential information and requires job tracking in step S310, and terminates the present processing routine.

As described above, in the present exemplary embodiment, in a case where the print job includes information indicating confidentiality and in a case where the print job is a job that handles confidential information, it is determined that the target job (that is, the print job) is a job that requires job tracking. As a result, it is possible to ensure security for the print job for which image is formed by the image forming apparatus 2 while considering that the print job is confidential.

Fourth Exemplary Embodiment

Next, a fourth exemplary embodiment will be described. The following is a modification example of the first exemplary embodiment. Since the fourth exemplary embodiment has the same configuration as the exemplary embodiments described above, identical parts are designated by identical reference numerals and detailed description thereof will not be repeated.

The image forming apparatus 2 can accumulate a print job in, for example, the accumulating unit 21. The print job accumulated in the accumulating unit 21 may be designated as a job that includes confidential information or handles the confidential information. In this case, a reference to the accumulated print job itself may also be confidential.

Therefore, in the fourth exemplary embodiment, in a case where the print job accumulated in the accumulating unit 21 is designated as the job that includes the confidential information or handles the confidential information, an information processing apparatus capable of executing additional authentication is provided in advance.

Figure 10:
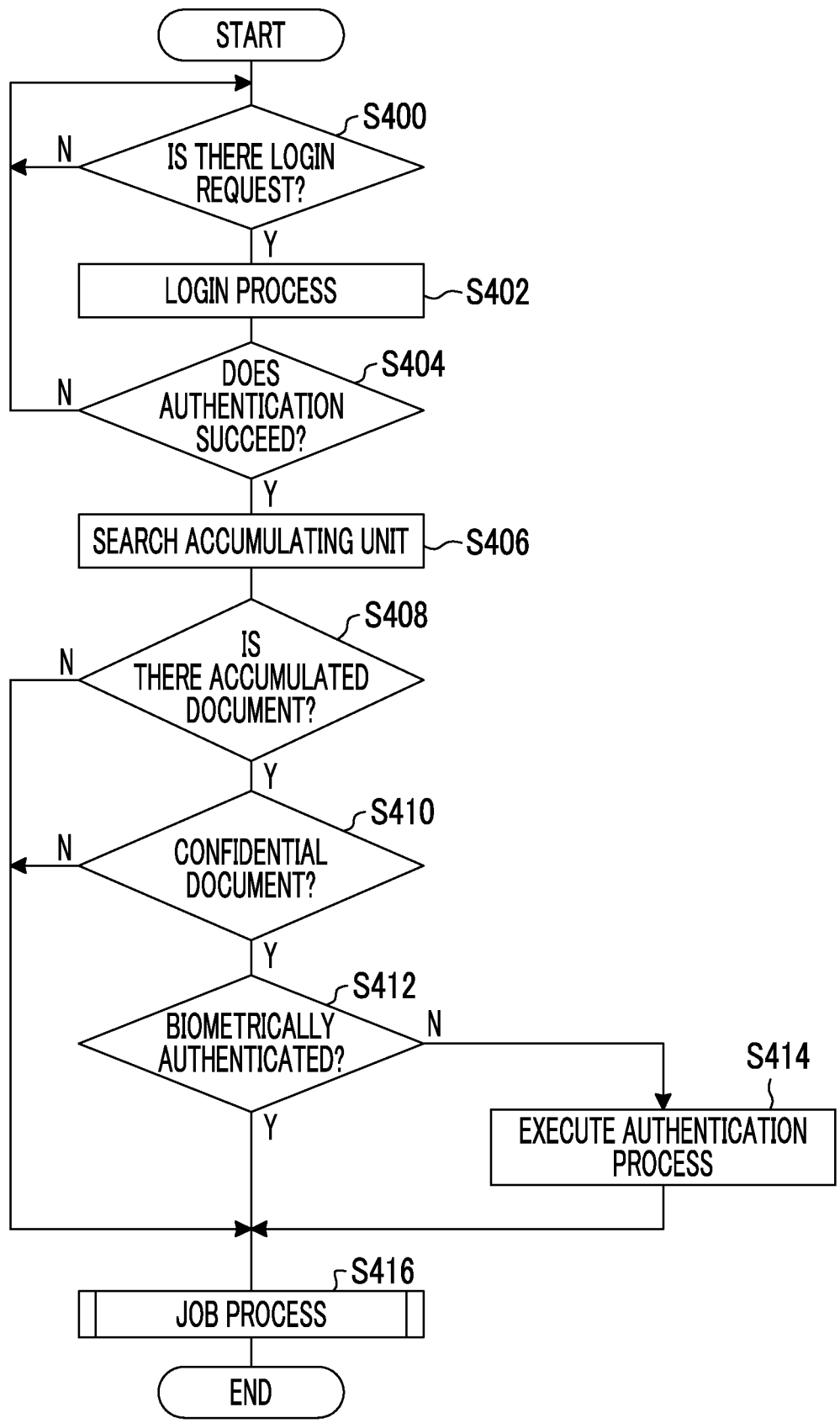
FIG. 10 is a flowchart illustrating an example of a flow of an information process executed in an image forming apparatus according to still another exemplary embodiment.

FIG. 10 is a flowchart illustrating an example of a flow of an information process executed in the image forming apparatus 2 according to the present exemplary embodiment.

The CPU 20A executes a login process, in the same manner as the login process illustrated in FIG. 6. Specifically, the CPU 20A repeats a negative determination until there is a login request from the user, and makes a positive determination in a case where there is the login request, in step S400, and executes a login process in step S402. The login process is a process for authenticating the user.

Next, in step S404, the CPU 20A determines whether or not authentication succeeds, based on the user authentication result in step S402. In a case where the authentication does not succeed, the CPU 20A makes a negative determination in step S404 and returns the processing to step S400, and shifts the processing to step S406 in a case where the authentication succeeds.

In step S406, the CPU 20A searches for a print job of the authenticated user among print jobs accumulated in the accumulating unit 21.

In step S408, the CPU 20A determines whether or not the print job of the authenticated user is accumulated in the accumulating unit 21. In a case where the print job of the authenticated user is not accumulated in the accumulating unit 21, the CPU 20A makes a negative determination in step S408, executes a job process in step S416, and terminates the present processing routine. In the job process in step S416, the processing in the same manner as the processing in steps S106 to S124 illustrated in FIG. 6 is executed.

On the other hand, in a case where the print job of the authenticated user is accumulated in the accumulating unit 21, the CPU 20A makes a positive determination in step S408, and determines whether or not the accumulated print job includes a confidential document in step S410. In step S410, it may be determined whether or not attribute information among respective pieces of information of the accumulated print jobs includes at least one of information indicating confidentiality or information indicating job designation for handling confidential information.

In a case where a negative determination is made in step S410, the CPU 20A shifts the processing to step S416, and in a case where a positive determination is made, the CPU 20A shifts the processing to step S412. In step S412, the CPU 20A determines whether or not the authentication of the authenticated user is a biometric authentication (a face authentication), and in a case of the biometric authentication, the CPU 20A makes a positive determination, and shifts the processing to step S416. In a case where a negative determination is made in step S412, the CPU 20A executes the biometric authentication as additional authentication in step S414, and then shifts the processing to step S416.

In a case where an authentication process of the biometric authentication by a face authentication is executed in step S414 and the authentication does not succeed, step S414 may be repeated a predetermined number of times until the authentication succeeds, and this processing routine may be terminated due to authentication failure.

As described above, according to the present exemplary embodiment, as compared with the case where the security level of the job accumulated in the accumulating unit is not considered, a burden on the user is reduced and deterioration of the security level for the job is suppressed, so that it becomes possible to ensure security.

Fifth Exemplary Embodiment

Next, a fifth exemplary embodiment will be described. Since the fifth exemplary embodiment has the same configuration as the exemplary embodiments described above, identical parts are designated by identical reference numerals and detailed description thereof will not be repeated.

An execution request for a job executed by the image forming apparatus 2 may be instructed by the user terminal 3. For example, in a case where a print output by the image forming apparatus 2 is required, the user may instruct the image forming apparatus 2 to execute a print job from the user terminal 3. In this case, in a case where the user faces an installation location of the image forming apparatus 2 and tries to acquire the print output, in a case where the user does not anticipate additional authentication such as a biometric authentication, a burden on the user increases.

Therefore, in the fifth exemplary embodiment, in a case where the user terminal instructs the execution of the job, an information processing apparatus capable of grasping in advance that the additional authentication is requested on the user terminal side is provided, as compared with the case where information related to the additional authentication process is not transmitted to the user terminal.

Figure 11:
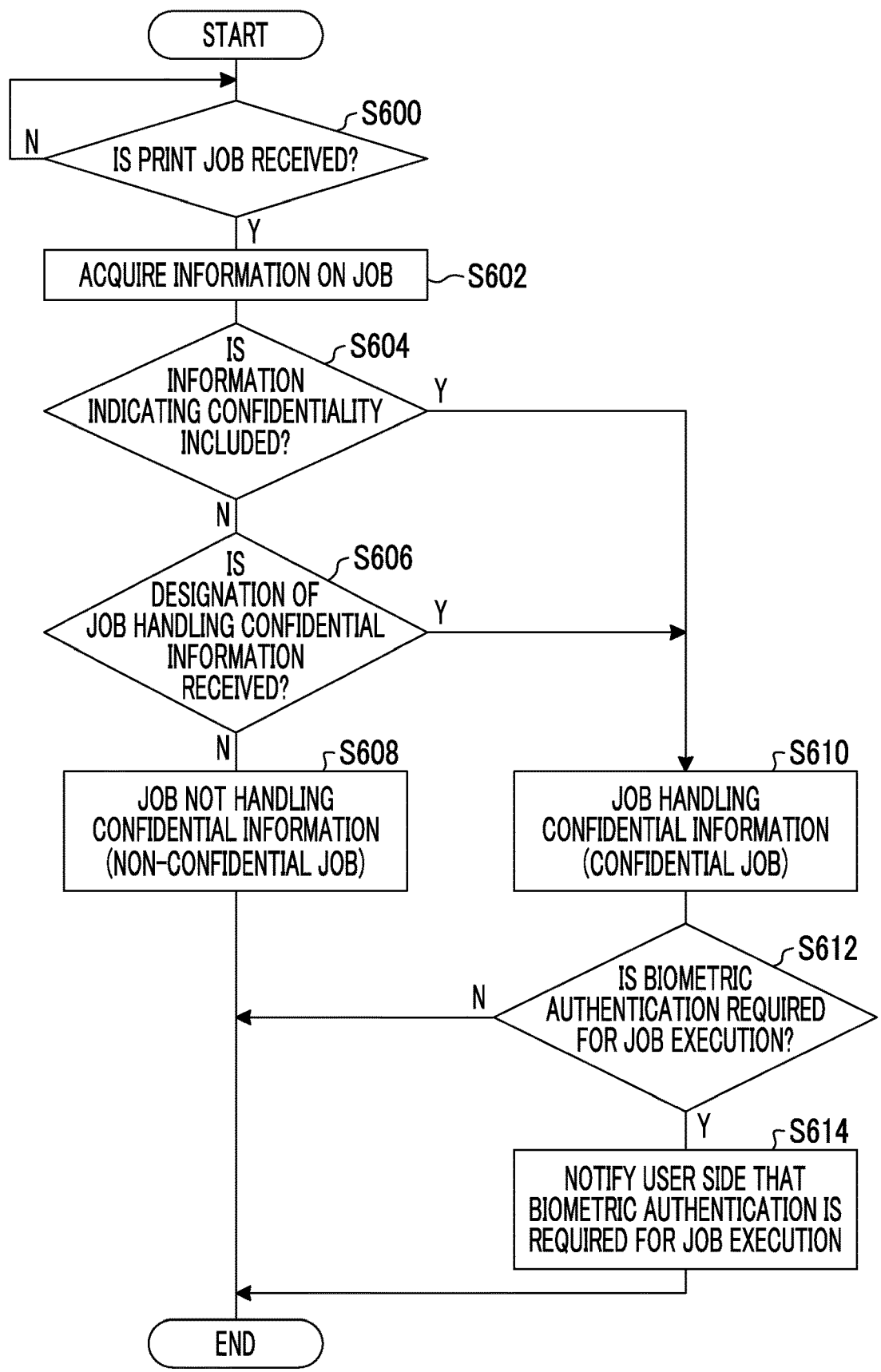
FIG. 11 is a flowchart illustrating an example of a flow of an information process executed in an image forming apparatus according to still another exemplary embodiment.

FIG. 11 is a flowchart illustrating an example of a flow of an information process executed in the image forming apparatus 2 according to the present exemplary embodiment. In the present exemplary embodiment, as an example of the job, a case where a print job is transmitted from the user terminal 3 will be described.

In step S600, the CPU 20A repeatedly executes a negative determination until the print job from the user terminal 3 is received. In a case of receiving the print job, the CPU 20A makes a positive determination and acquires information on the job in step S602.

An example of the information of the print job acquired in step S602 includes attribute information related to the print data and processing information indicating an image forming process for the print data. The attribute information can include, for example, information indicating confidentiality, and information indicating job designation for handling confidential information.

Next, in step S604, the CPU 20A determines whether or not the acquired information on the job includes information indicating confidentiality in the print job. The determination in step S604 may be determination of whether or not the attribute information includes the information indicating confidentiality. In a case where a positive determination is made in step S604, the CPU 20A shifts the processing to step S610.

In a case where a negative determination is made in step S604, the CPU 20A determines whether or not there is a job designation that handles confidential information for the print job, in step S606. The determination in step S606 may be determination of whether or not the attribute information includes information indicating the job designation for handling confidential information. In a case where a positive determination is made in step S606, the CPU 20A shifts the processing to step S610. In a case where a negative determination is made in step S606, the CPU 20A determines that the print job is a non-confidential job that is not a job of handling confidential information and does not require job tracking in step S608, and terminates the present processing routine.

In a case where the print job includes information indicating confidentiality (a positive determination in step S604) and in a case where there is a job designation for handling confidential information (a positive determination in step S606), the CPU 20A processes the print job as a confidential job, in step S610. That is, the CPU 20A determines that the job is a confidential job that handles the confidential information and requires job tracking, and shifts the processing to step S612.

In step S612, it is determined whether a biometric authentication is required to execute the job of the print job, that is, whether or not the print job is a job for which biometric authentication is requested. In step S612, the determination is performed based on an authentication determination condition. The authentication determination condition is a predetermined condition for determining authentication requested when the received print job is executed. An example of the authentication determination condition is a condition that requests a biometric authentication for execution of the confidential job. Another example of the authentication determination condition is a condition in which a biometric authentication is not requested for execution of the confidential job in a case where the user is logged in by a biometric authentication in a case where the user operates the user terminal 3. This is because it is possible that the biometric authentication is not requested in this condition, in a case where the biometric authentication is completed in a case where the confidential job is executed by the image forming apparatus 2. Information on whether or not a biometric authentication is completed may be discriminated by acquiring information indicating an authentication method in a case where the user is logged in the user terminal 3 from the job information. Further, in a case where the user is logged in by ID card authentication, a condition requesting a biometric authentication may be applied to execution of the confidential job.

Therefore, for example, in a case where the image forming apparatus 2 has a predetermined condition for executing a biometric authentication for the confidential job as an authentication determination condition, a positive determination is made in step S612. Further, in a case where the user is logged in by a biometric authentication in a case of operating the user terminal 3, even in a case where the print job is a confidential job, a negative determination is made in step S612. In a case of a negative determination in step S612, the CPU 20A terminates the present processing routine, and in a case of a positive determination, the CPU 20A shifts the processing to step S614.

In step S614, the CPU 20A terminates the processing routine after notifying the user side that a biometric authentication is required to execute the job. Specifically, the user side is notified by transmitting information related to the authentication process indicating that the biometric authentication is requested for job execution, for example, a message to the user terminal 3 that transmits the received print job. This message can include information on the requested authentication, for example, information indicating an action for a user who is requested to authenticate by a biometric authentication method such as a face authentication and is requested at a time of the authentication. As a result, the user can confirm in advance what kind of authentication is requested and what kind of action is requested.

As described above, in the present exemplary embodiment, in a case where a print job for job execution transmitted from a user terminal is received, information related to an additional authentication process by a biometric authentication method such as a face authentication is transmitted to the user terminal. As a result, it is possible for the user terminal to confirm that authentication by the biometric authentication method such as a face authentication is additionally requested before executing the print job.

As described above, the information processing apparatus according to the exemplary embodiment is described above as an example. The exemplary embodiment may be provided in a form of a program for causing a computer to execute the function of each of the units included in the information processing apparatus. The exemplary embodiment may be provided in a form of a storage medium readable by a computer which stores the program.

In addition, the configuration of the information processing apparatus described in the exemplary embodiment described above is merely an example, and may be changed according to a situation within a range not deviating from the gist.

Further, a flow of the processing of the program described in the exemplary embodiment is also an example and unnecessary steps may be deleted, new steps may be added, or the processing order may be exchanged within the range not deviating from the gist.

In addition, in the exemplary embodiment described above, the case where the processing according to the exemplary embodiment is realized by a software configuration using a computer by executing the program, but the exemplary embodiment is not limited thereto. The exemplary embodiment may be realized by, for example, a hardware configuration or a combination of the hardware configuration and the software configuration.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
execute an authentication process of authenticating a user by a first authentication process, which is any one of a plurality of authentication processes having different security levels;
determine a security level of a job based on data on which the job is to be executed;
determine a security level of the first authentication process by which the user is authenticated is lower than the security level of the job;
set the security level of the job to be higher than the security level of the first authentication process by determining that a job tracking is required for the data on which the job is executed, wherein the job satisfies a predetermined security condition in which at least a part of data of the job is to be transmitted to an external network; and
execute, in a case where execution of the job is instructed by the authenticated user authenticated by the first authentication process, and the security level of the first authentication process is lower than the security level of the job, another authentication process of authenticating the authenticated user by a second authentication process having a security level higher than the security level of the first authentication process among the plurality of authentication processes as an additional authentication process.

2. The information processing apparatus according to claim 1, wherein the processor is configured to:
execute no additional authentication process in a case where the security level of the first authentication process is equal to or higher than the security level of the job.

3. The information processing apparatus according to claim 2, wherein the processor is configured to:
execute, in a case where the security level of the first authentication process is lower than the security level of the job, an authentication process having a security level equal to or higher than the security level of the job as the additional authentication process.

4. The information processing apparatus according to claim 2,
wherein the additional authentication process is a biometric authentication.

5. The information processing apparatus according to claim 2, wherein the processor is configured to:
transmit, in a case where a job designated by a user terminal is acquired, an instruction for execution of the acquired job is given, and execution of the additional authentication process is predicted, information related to the additional authentication process to the user terminal.

6. The information processing apparatus according to claim 3,
wherein the security condition is that at least a part of data of the job includes confidential information.

7. The information processing apparatus according to claim 3,
wherein the additional authentication process is a biometric authentication.

8. The information processing apparatus according to claim 1, wherein the processor is configured to:
execute, in a case where the security level of the first authentication process is lower than the security level of the job, an authentication process having a security level equal to or higher than the security level of the job as the additional authentication process.

9. The information processing apparatus according to claim 8,
wherein the security condition is that at least a part of data of the job includes confidential information.

10. The information processing apparatus according to claim 8,
wherein the additional authentication process is a biometric authentication.

11. The information processing apparatus according to claim 8, wherein the processor is configured to:
transmit, in a case where a job designated by a user terminal is acquired, an instruction for execution of the acquired job is given, and execution of the additional authentication process is predicted, information related to the additional authentication process to the user terminal.

12. The information processing apparatus according to claim 1,
wherein the additional authentication process is a biometric authentication.

13. The information processing apparatus according to claim 1,
wherein the execution of the job to the data includes at least one of an e-mail transmitting process of the data, a facsimile transmitting process of the data, a network transmitting process of the data, a printing process of the data, and a scanning process of the data.

14. The information processing apparatus according to claim 1, wherein the processor is configured to:
transmit, in a case where a job designated by a user terminal is acquired, an instruction for execution of the acquired job is given, and execution of the additional authentication process is predicted, information related to the additional authentication process to the user terminal.

15. A non-transitory computer readable medium storing a program causing a processor to perform an authentication process, the process comprising:
executing an authentication process of authenticating a user by a first authentication process, which is any one of a plurality of authentication processes having different security levels;
determining a security level of a job based on data on which the job is to be executed;

determining a security level of the first authentication process by which the user is authenticated is lower than the security level of the job;

setting the security level of the job to be higher than the security level of the first authentication process by determining that a job tracking is required for the data on which the job is executed, wherein the job satisfies a predetermined security condition in which at least a part of data of the job is to be transmitted to an external network; and executing, in a case where execution of the job is instructed by the authenticated user authenticated by the first authentication process, and the security level of the first authentication process is lower than the security level of the job, another authentication process of authenticating the authenticated user by a second authentication process having a security level higher than the security level of the first authentication process among the plurality of authentication processes as an additional authentication process.

* * * * *